United States Patent [19]

Hill

[11] Patent Number: 4,812,282

[45] Date of Patent: Mar. 14, 1989

[54] PROCESS FOR FORMING POLYMER CONTAINER HAVING INORGANIC FILLER AND COUPLING AGENT

[75] Inventor: Edward T. Hill, Johannesburg, South Africa

[73] Assignee: Standplastics (Proprietary) Limited, Johannesburg, South Africa

[21] Appl. No.: 102,326

[22] Filed: Sep. 29, 1987

[51] Int. Cl.$^4$ .............................................. B29C 49/04
[52] U.S. Cl. ..................... 264/540; 264/108; 264/210.6
[58] Field of Search ............... 264/540, 210.6, 108; 523/216, 200; 524/382

[56] References Cited

U.S. PATENT DOCUMENTS

| | | | |
|---|---|---|---|
| 3,803,065 | 4/1974 | Arai et al. | 264/23 H |
| 4,221,697 | 9/1980 | Osborn et al. | 525/10 |
| 4,433,073 | 2/1984 | Sano et al. | 524/522 |

FOREIGN PATENT DOCUMENTS

| | | |
|---|---|---|
| 0153193 | 8/1985 | European Pat. Off. |
| 53-132049 | 11/1978 | Japan |
| 856422 | 9/1987 | South Africa |
| 905069 | 9/1962 | United Kingdom |
| 1509283 | 5/1978 | United Kingdom |
| 1515645 | 6/1978 | United Kingdom |
| 1525418 | 9/1978 | United Kingdom |

*Primary Examiner*—Jan H. Silbaugh
*Assistant Examiner*—Neil Michael McCarthy
*Attorney, Agent, or Firm*—Wegner & Bretschneider

[57] ABSTRACT

A method for producing a blow-moulded container which is characterized by the use of a polymer composition which comprises a polymer selected from olefin polymers, olefin co-polymers and vinylchloride polymers, 20 to 55% by mass of an inorganic filler having a density in the range of 2 to 3 g/cc and an average particle size of less than 50 microns, and a coupling agent having a group capable of bonding to the surface of the filler and an organic filler segment.

20 Claims, 1 Drawing Sheet

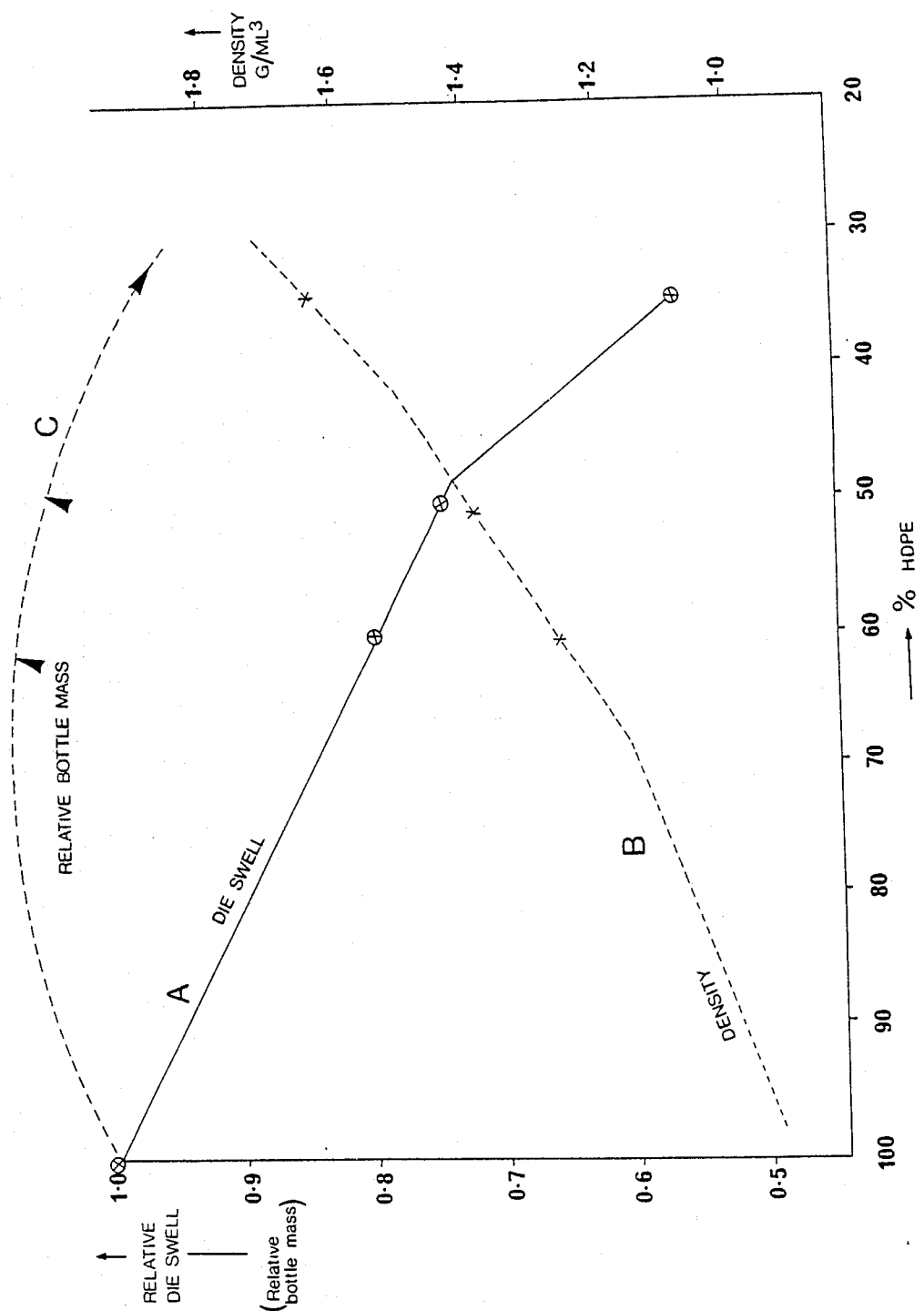

PROCESS FOR FORMING POLYMER CONTAINER HAVING INORGANIC FILLER AND COUPLING AGENT

BACKGROUND OF THE INVENTION

This invention relates to a method for producing blow-moulded containers.

Many millions of containers are produced annually around the world by blow moulding. Blow moulding involves extruding a polymer composition through a die to form a discrete, hollow extrudate, inflating that extrudate against the mould surface to form the container, and removing the container from the mould surface. The polymer compositions which may be used for producing blow-moulded containers include olefin polymers, olefin co-polymers and vinyl chloride polymers.

Blow-moulded containers have been produced which contain a small amount of particulate filler such as calcium carbonate. To the best of the Applicant's knowledge, no blow-moulded containers containing more than 15% by mass of a particulate filler have been produced on a commercial scale. The reason for this is that if more than 15% by mass of inorganic filler is added to the polymer composition, the container which is produced has unacceptable physical, mechanical and other properties. In particular, it has been found that the impact resistance, an important characteristic of most blow-moulded containers, is sharply reduced with the higher contents of inorganic filler. There is thus a prejudice in the art against using more than 15% by mass of inorganic filler in blow-moulded containers.

Particulate fillers are used for manufacturing other articles from polymer compositions. For example, in injection moulding, relatively high contents of inorganic filler can be tolerated without adversely affecting the properties of the article. The compositions may also include a coupling agent such as that described in British Patent Specifications Nos. 1,525,418, 1,509,283 and 1,515,645. It is to be noted that the compositions described in the three British patent specifications are all useful for injection moulding. There is no suggestion teaching in any one of these specifications that the combination of a particulate filler and a coupling agent would be useful in polymer compositions useful for producing blow-moulded containers.

British Patent Specification No. 905,069 describes a polymer composition comprising a blendable polyolefin and a finely-divided coated carbonate filler. The coating of the carbonate filler may be a higher fatty acid. The specification suggests that the compositions may be useful for moulding, blowing, extruding and pressing. There is no suggestion that the compositions may be useful for producing blow-moulded articles and indeed, there is no working example of the fabrication of the composition into any particular shaped article.

Japanese Patent Publication No. 53-132,049 describes a polymer composition containing an inorganic filler and dibenzylidenesorbitol. The composition is said to produce shaped articles which have improved surface lustre. It is believed that the surface lustre is produced by the dibenzylidenesorbitol, a hydrophilic and organophobic material, migrating through the polymer to the surface of the shaped article. The specification states that the composition may be moulded by calendar moulding, extrusion moulding, injection moulding and blow moulding to produce films, sheets and hollow bottles. It is to be noted that there is no working example illustrating the production of hollow bottles by blow moulding the compositions. The melt indices of the polymers used in the working examples indicates that in each example an injection moulded article was produced.

The patent literature also contains other publications describing polymer compositions containing inorganic fillers and coupling agents. However, none of this art describes or suggests that such compositions would be useful in producing blow-moulded containers.

SUMMARY OF THE INVENTION

According to the present invention, there is provided a method of producing a container including the steps of:

(a) providing a polymer composition comprising a polymer selected from olefin polymers, olefin co-polymers and vinylchloride polymers, 20 to 55% by mass of the composition and of inorganic filler having a density in the range of 2 to 3 g/cc and an average particle size of less than 50 micron and a coupling agent having a group capable of bonding to the surface of the filler and an organophilic segment;

(b) extruding the composition through a die to form a discrete hollow extrudate;

(c) inflating the extrudate against a mould surface to form the container; and (d) removing the container from the mould surface.

DESCRIPTION OF THE DRAWING

The drawing is a graph illustrating the relationship between die swell and content of inorganic filler for a high density polyethylene (HDPE)/calcium carbonate system.

DETAILED DESCRIPTION OF THE INVENTION

The method of the invention produces a blow-moulded container. The container can take any suitable form useful for holding a discrete amount of a material, flowable or otherwise, for delivery from the point of filling to its point of use. The container may be rigid or semi-rigid.

The polymer is chosen from the group of olefin polymers, olefin co-polymers and vinylchloride polymers. The polymer must be so chosen as to be suitable for producing a blow-moulded container. For example, the polymer may be a polyethylene with a melt index in the range 0.05 to 4 dg/min when tested according to the ISO/R292 international standard. The polymer may also be a polypropylene, for example with a melt index in the range 0.05 to 4 dg/min when tested according to the ISO/DR 748 internationl standard. The polymer may also be a polyvinyl chloride having a K-value in the range 50-70.

The K-value of the polyvinylchloride is a measure of its viscosity in a solvent. These polymers are all examples of polymers which are suitable for producing blow-moulded containers.

The polymer composition which is used for blow moulding the container contains a high percentage by mass of inorganic filler and much higher than has been achieved in the prior art. The amount of inorganic filler used, the density and average particle size of the inorganic filler are critical to the practice of the invention.

In extrusion processes the dimensions of the extrudate differ from the dimensions of the die itself because of the phenomenon known as die swell which results from the visco-elastic nature of the polymeric or elastomeric substance. The inorganic filler which is present in the polymer composition has the effect of reducing the die swell of the composition. It has been found that as the amount of the inorganic filler is increased, so there is a decrease in die swell. It has further been found that if the inorganic filler has a density in the range 2 to 3 then the rate of decrease of die swell with the addition of the inorganic filler is approximately the same as the rate of increase of the density of the composition having the inorganic filler added thereto. This similarity in rates continues until the inorganic filler constitutes approximately 55% by mass of the composition. Thereafter, the rate of decrease in die swell increases sharply. This relationship is depicted graphically on the attached FIG. 1. Line A reresents the decrease in die swell with the addition of inorganic filler, and line B illustrates the increase in the density of the composition with the addition of inorganic filler. It will be noted that with more than about 55% by mass of inorganic filler the rate of decrease of the die swell is no longer linear and it drops away sharply. Thus, at these higher inorganic filler contents, the amount of die swell is insufficient to produce a hollow extrudate which is capable of being blow moulded on standard equipment and modifications to this equipment are required adding considerably to the expense.

As the die swell decreases, so the amount or volume of polymer composition being extruded decreases. However, the density of that composition increased at the same rate which means that the relative mass of the extrudate remains essentially the same. Indeed, it has been found that the relative mass of the extrudate remains within about 10% of the mass of an extrudate produced with pure polymer. Line C in the attached FIG. 1 illustrates graphically this point. It has thus been found that provided the inorganic filler has a density in the range 2 to 3 g/cc then a container having a relative mass within 10% of the relative mass of a container produced using pure polymer can be produced. Since there is a lesser amount of material being extruded, the wall thickness of the container with the inorganic filler will be somewhat less than that produced using the pure polymer. The inorganic filler is considerably cheaper than the polymer which means that savings in the cost of the container are achieved.

The average particle size of the inorganic filler must be less than 50 microns. For containers of less than 10 litres, the average particle size of the inorganic filler will generally be less than 5 microns.

The inorganic filler is preferably present in an amount of 25 to 50% by mass of the composition. Examples of suitable inorganic fillers are calcium carbonate, talc, mica, silicates, wollastonite, dolomite and gypsum. It is also esential to the invention that the polymer composition contains a coupling agent for without it the high inorganic filler content cannot be tolerated. The coupling agent has a group capable of bonding to the surface of the filler. This group is polar in nature and will bond by physical forces, or chemical forces, or a combination thereof, to the filler. The coupling agent will also have an organophilic segment which is non-polar in nature and will be compatible with the polymer. In this manner, the filler is coupled to the polymer. Examples of suitable coupling agents are titanates, long-chain carboxylic acids, and salts and esters of such acids. Particularly good results have been obtained with coupling agents described in British Patent Specifications Nos. 1,525,418, 1,509,283 and 1,515,645, the disclosures of which are incorporated herein by reference. It is significant to note that although these coupling agents have been known and used commercially for many years, they have, to the best of the Applicant's knowledge, never been used in polymer compositions used for producing blow-moulded containers.

The coupling agent should be present in such quantity as to form at least a mono-molecular layer over the entire surface of the inorganic filler. Typically, the coupling agent is present in an amount of 0.1 to 5% by mass, more preferably 0.05 to 1% by mass, of the inorganic filler.

The coupling agent may be a coupling agent having the formula:

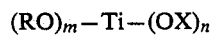

wherein
m and n each lie between 1 and 4
m+n lie between 3 and 6
R is an alkyl group of 1 to 30 carbon atoms and
OX is an acid radical or an ester thereof.

The acid radical in the above formula may be a carboxy radical having the formula $-OCOR_2$ wherein $R_2$ is an alkyl radical of 1 to 30 carbon atoms. Examples of such coupling agents are:
1. Isopropyl triisostearoyl titanate.
2. A mixture of coupling agents defined above wherein R is an isopropyl radical, m has an average value not less than 0.75, OX is an isostearoyl radical, and n has an average value between 1.0 and 3.25.

The acid radical in the above formula may also be a phosphoric acid ester having the formula:

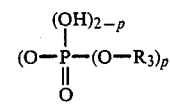

or a pyrophosphoric acid ester having the formula:

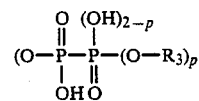

wherein $R_3$ is an alkyl radical of 1 to 30 carbon atoms and p has a value between 0 and 2.

Examples of such coupling agents are:
1. Isopropyl tri-(dioctylphosphato) titanate.
2. A mixture of coupling agents defined above wherein R is an isopropyl radical, m has an average value not less than 0.75, OX is an ester of phosphoric acid, n has an average value between 1.0 and 3.25, the alkyl radical $R_3$ is an octyl radical and p has an average value between 0.75 and 2.0.
3. Isopropyl tri-(dioctylpyrophosphato)titanate
4. A mixture of coupling agents defined above wherein R is an isopropyl radical, m has an average value not less than 0.75, OX is an ester of pyrophosphoric acid, n has an average value between 1.0 and 3.25, the alkyl radical $R_3$ is an octyl radical, and p has an average value between 0.75 and 2.0.

The acid radical in the above formula may also be a benzene-sulphonic acid ester having the formula:

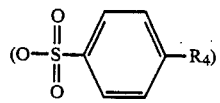

wherein $R_4$ is an alkyl radical of 1 to 30 carbon atoms. Examples of such coupling agents are:

1. Isopropyl tridodecylbenzenesulphonyl titanate.
2. A mixture of coupling agents defined above wherein R is an isopropyl radical, m has an average value not less than 0.75, OX is an ester of benzene-sulphonic acid, n has an average value between 1.0 and 3.25, and the alkyl radical $R_4$ is a dodecyl radical.

The most suitable commercially available organic titanate coupling agent for the present invention was found to be TILCOM CA 25, as supplied by TIL Division, Tioxide UK Ltd. Other coupling agents also found to be suitable include TILCOM CA 10 and TILCOM CA 20, also from TIL Division, Tioxide UK Ltd., various products from Kenrich Petrochemicals Inc., U.S.A., including KENREACTs TTS, KR9S, KR 12 and KR 38S and their corresponding 'nneoalkoxy' derivatives, such as for example LICA 12; Isostearoyltitanate from Dynamit Nobel, GFR; and from Nippon Soda, Japan, the products TTS, and TTOP.

The polymer compositions used in the practice of the invention may be formulated by methods known in the art. In general, these methods include the step of blending or mixing the various components. It has been found preferable to pre-coat the coupling agent on to the inorganic filler and then to blend the coated material into the polymeric base. Adducted, solubilised or pelletised froms of the titanate coupling agents, such as for example, so-called "neoalkoxy" forms which are commercially available and designed for direct feeding into the extruder hopper together with the other components may also be used.

More generally, where a coating procedure is adopted and the polymeric base is in a granular or pelletised form, a melt blending procedure is to be preferred, using for example a compounding extruder or a Banbury mixer/melt extruder combination. This is particularly desirable if the extrusion step to form the final product involves a short barreled extruder.

Masterbatching and similar extablished techniques may also be employed where practical.

The polymeric composition may also contain other additives such as stabilisers, antioxidants, colorants, lubricants, etc., which are normally included in such compositions.

The method of the invention produces blow moulded containers which have a high inorganic filler content resulting in considerable cost savings in the materials. These savings are achieved without loss of strength, impact resistance and other mechanical properties of the container. Further, it has been found that the speed of producing the containers can be increased which also results in cost savings.

EXAMPLES OF THE INVENTION

The invention is illustrated by the following nonlimiting examples:

EXAMPLE 1

A high molecular mass high density polyethylene was being used to make a 500ml bottle of mass in the range 36-38g on a conventional blow moulding machine fitted with a conventional parison programmer. 50kg of this high density polyethylene was mixed in a high speed mixer with 50kg of finely divided calcium carbonate and 200g of isopropyl triisostearoyl titanate and subsequently extruded and pelletised. Using the same blow molding machine and within the variation permitted by the parison programmer it was found possible to make bottles of mass 28-45g. Moreover it was found that bottles made from the composition of mass 33g had impact diffusion rates and other physical properties adequate to replace 36g bottles made from the original polymer; and that satisfactory bottles could be made from the composition at a mass temperature of 140°-145° C., as compared with the 160° C. normally used with the parent polyethylene; whilst the cycle time necessary to make acceptable bottles could be reduced from the 20 seconds used with the parent polymer to 15 seconds with the composition. Similar improvements in mass temperature and cycle time were shown in all the compositions containing calcium carbonate and used for blow molding described in the following examples.

EXAMPLE 2

50kg of the high density polyethylene known commercially as Hostalen GF 7650 was blended with 50kg of finely divided calcium carbonate which had previously been coated in a high speed mixer with a 50/50 mixture of 100g each of isopropyl triisostearoyl titanate and isopropyl tri-(dioctylphosphato) titanate and subsequently pelletised using a conventional twin screw compounding extruder with vacuum venting. The pelletised material was used in the same blow molding equipment and with the same mold as in Example 1 to produce 500ml bottles in the mass range 30-36g. The impact test for bottles in the 36-38g range made in the same mold from high density polyethylene required withstanding a single fall of 75cm when filled with water at 20° C. The composite bottles at all masses in the range 30-36 g survived two falls of 125cm under the same conditions without failure. Moreover composite bottles under test with various commercial contents showed the following satisfactory figures for loss in mass of contents and no other significant effects after 19 days exposure at ambient temperature.

| Contents | Bottle mass g | Loss in content mass % |
|---|---|---|
| Concentrated hydrochloric acid | 32.8 | 0.1 |
|  | 33.0 | 0.25 |
| Sunflowerseed oil | 32.5 | 0.08 |
|  | 33.2 | 0.06 |
| Household detergent | 32.9 | 0.08 |
|  | 33.1 | 0.21 |
| Methylated spirits | 33.5 | 0.38 |
|  | 33.1 | 0.38 |

EXAMPLE 3

In a similar experiment to the above the coating was changed to 200g of isopropyl tri-(dioctylphosphato) titanate. All other conditions were the same as for Example 2. No difficulty was found in manufacturing similar bottles to those described in Example 2, and similar impact and exposure properties were found.

In addition this composition was used to blow a container of approximately 2l capacity of an exaggerated rectangular cross-section known to give difficulties during the blowing operation with conventional high density polyethylenes with resultant unacceptable thinning of the corners. No difficulties were found in blow molding bottles from the composition of the same mass (115g) as from the conventional high density polyethylene, and the appearance and impact strength of the composite bottle were found to be better than these properties in the polyethylene bottle.

In a further experiment this composition was used to manufacture a 5l container with a side handle. Aagin no problems were found in manufacture at or below the bottle mass (approx. 208g) used for the conventional polyethylene resin, and impact properties and appearance were judged better than with the polyethylene, with a sample container of the composition filled with water at 20° C. surviving unharmed three drop tests of 125cm, as against the single fall of 75cm required from the polyethylene bottle. On this container the maximum capacity was measured as 5.4l at 20° C., as against the 5.27l of a similar container made from polyethylene.

EXAMPLE 4

In a similar experiment to Example 3 the polymer was changed to the linear low density polyethylene known commercially as Alcithene LB 3090, all other conditions being unchanged. In this experiment a different 5l mold for a container with a side handle was used, with a mass of approximately 180g using the conventional polyethylene. Again the composition was found to replace the parent resin without processing problems, and commercially acceptable properties were found with the composite bottles.

EXAMPLE 5

For a very high performance 5l container to meet an SABS/SAR impact test demanding a fall filled with water at 20° C. of eight drops (one on each corner of the rectangular container) of 125cm the very high molecular mass high density polyethylene known commercially as Hostalen GM 7650 is normally used with a container mass of 230–250g. In this case a composition was made by mixing 60kg of this polymer base with 40kg of finely divided calcium carbonate which had previously been coated with 240g of isopropyl tri-(dioctylphosphato) titanate. All other conditions were as described earlier. Again no difficulty was found in processing the composition to produce containers of similar mass to those made from the polymer base, and with properties meeting the specification.

EXAMPLE 6

In this experiment an unplasticised poly(vinyl chloride) blow molding compound was used as the comparison. This compound as normally manufactured contained 150kg of the polymer (AECI Type 57), 30kg of methacrylic/butadiene/styrene impact modifier (Kureha BTA 3) and approximately 3kg of stabilisers and other chemical ingredients. 25kg of this compound was mixed in a high speed mixer with 10kg of regranulated (scrap) compound of similar composition, 25kg of finely divided calcium carbonate and 150g of a Drimix containing 28 per cent of an inert carrier (Microcel ex Johns Mandeville) and 72 per cent of isopropyl tri- (dioctyl-pyrophosphato) titanate. After blending for three minutes at the higher speed of the mixing machine the composition was fed directly to a blow molding machine. No difficulty was found in plasticising the composition although the resultant product was opaque white rather than transparent as the bottle made from the polymer base.

EXAMPLE 7

50kg of an extrusion grade of polypropylene was compounded with 50kg of a finely divided calcium carbonate which had previously been coated with 250g of isopropyl triisostearoyl titanate as described above. The composition could be processed and extruded into bottles in a similar way to the virgin resin, and products obtained without alternation of the die settings of the processing machinery were similar in mass to those made from the polymer base and had commercially acceptable properties.

EXAMPLE 8

This example teaches the use of various coupling agents in compositions based upon 50kg of the linear low density polyethylene known commercially as Alcithene LB 3090 and 50kg of finely divided calcium carbonate. In each case 250g of the coupling agent was used, and compounding was on a Banbury mixer. The compositions were extruded through a simple circular profile die under identical conditions at a mass temperature of 190° C., and die swell, extrusion characteristics and appearance were assessed.

The coupling agents examined were as follows:
no coupling agent (control)
stearic acid
isopropyl triisostearoyl titanate
mixture of isopropyl di- and triisostearoyl titantes
isopropyl tri-(dioctylphosphato) titanate
mixture of tri-(monooctylphosphato) and tri(dioctylphosphato) titanates Results may be summarised as follows:
1. Die swell in all compositions was essentially the same.
2. The control sample could only be extruded at a temperature above the standard (225° C.)
3. Extrusion characteristics with stearic acid were not as good as with the titanate coupling agents, although extrudate appearance was good.
4. All the titanate coupling agents gave generally similar extrusion characteristics, with the stearoyl-containing materials marginally superior.
5. Stearoyl-containing coupling agents gave buff colored extrudates whilst those containing phosphate esters were off-white.

A limited evaluation of these materials on a blow molding machine indicated similar characteristics to those found during profile extrusion. In particular use of the composition without coupling agent was found to give leakage at the barrel-die flange, presumably due to the pressure generated, except at high mass temperatures.

EXAMPLE 9

Finely divided calcium carbonate was coated in a high speed mixer as described earlier with 0.5% by mass of its own mass of stearic acid and the coated material was melted blended and subsequently pelletised using a conventional twin screw compounding extruder with vacuum venting with the high density polyethylene known commercially as Hostalen GF 7650 to form compositions containing respectively 20% and 30% of the coated filler. Bottles were blown from these compounds using conventional blow moulding machinery and a variety of commercial moulds in the one to two-and-a-half (2½) liter capacity range. In an extended test over a period of up to six months these bottles were filled with a variety of commercial formulations for water-based chemical products and evaluated against commercial requirements for conventional high density polyethylene bottles. In all cases results, which includes both drop tests after exposure and loss of contents, were within the acceptance limits of the commercial specifications.

EXAMPLE 10

This example is identical to that in Example 9 above except that the coating medium instead of being stearic acid was the commercially available titanate coupling agent known as TILCOM CA 25; and in addition to the high density polyethylene known as Hostalen GF 7650 the linear low density polyethylene known as Alcithene LB 3090 was used, again in compositions containing 20% and 30% of the coated filler. Again after long term tests against commercial requirements all results were within the acceptance limits of commercial specifications.

I claim:

1. A method of producing a container, comprising the steps of:
    (a) providing a polymer composition comprising a polymer selected from the group consisting of olefin polymers, olefin co-polymers and vinylchloride polymers, and 20 to 55% by mass of the composition of an inorganic filler having a density in the range of 2 to 3 g/cc and an average particle size of less than 50 microns and a coupling agent having a group capable of bonding to the surface of the filler and an organophilic segment compatible with said polymer;
    (b) extruding the composition through a die to form a discrete hollow extrudate;
    (c) inflating the extrudate against a mould surface to form the container; and
    (d) removing the container from the mould surface, and wherein said container is formed having a mass within 10% of a container if formed using the claimed process and composed of 100% of said polymer, and wherein said container is formed having impact resistance and content diffusion properties adequate to replace the container formed of 100% of said polymer.

2. A method according to claim 1 wherein the inorganic filler is present in an amount of 25 to 50 percent by mass of the composition.

3. A method according to claim 1 wherein the inorganic filler is selected from the group consisting of calcium carbonate, talc, mica, silicates, wollastonite, dolomite and gypsum.

4. A method according to claim 3 wherein the inorganic filler is a calcium carbonate.

5. A method according to claim 1 wherein the coupling agent is selected from the group consisting of titanates, long-chain fatty acids and salts and esters of such acids.

6. A method according to claim 5 wherein the coupling agent is stearic acid, or a salt or ester of stearic acid.

7. A method according to claim 5 wherein the coupling agent is a titanate having the formula:

$$(RO)_m-Ti-(OX)_n$$

wherein
m and n is between 1 and 4
m+n lie between 3 and 6
R is an alkyl group of 1 to 30 carbon atoms and
OX is an acid radical or an ester thereof.

8. A method according to claim 7 wherein the acid radical is a carboxy radical having the formula:

$$(O-\underset{\underset{O}{\|}}{C}-R)$$

wherein R is an alkyl radical of 1 to 30 carbon atoms.

9. A method according to claim 8 wherein the coupling agent is isopropyl triisostearoyl titanate.

10. A method according to claim 8 wherein the coupling agent is a mixture of coupling agents defined in claim 8 wherein R is an isopropyl radical, m has an average value not less than 0.75, OX is an isostearoyl radical, and n has an average value between 1.0 and 3.25.

11. A method according to claim 7 wherein the acid radical is a phosphoric acid ester having the formula:

$$(O-\underset{\underset{O}{\|}}{\overset{(OH)_{2-p}}{P}}-(O-R_3)_p)$$

wherein R is an alkyl radical of 1 to 30 carbon atoms and p has a value between 0 and 2.

12. A method of claim 7 wherein the acid radical is a pyrophosphoric acid ester having the formula:

$$(O-\underset{\underset{OH}{|}}{\overset{O}{\|}}{P}-\underset{\underset{O}{\|}}{\overset{(OH)_{2-p}}{|}}{P}-(O-R_3)_p)$$

wherein $R_3$ is an alkyl radical of 1 to 30 carbon atoms and p has a value between 0 and 2.

13. A method according to claim 11 wherein the second component is isopropyl tri-(dioctylphosphato) titanate.

14. A method according to claim 11 wherein the coupling agent is a mixture of coupling agents defined in claim 11 wherein R is an isopropyl radical, m has an average value not less than 0.75, OX is an ester of phosphoric acid, n has an average value between 1.0 and 3.25, the alkyl radical R is an octyl radical and p has an average value between 0.75 and 2.0.

15. A method of claim 12 wherein the coupling agent is isopropyl tri-(dioctylpyrophosphato) titanate.

16. A method according to claim 12 wherein the coupling agent is a mixture of coupling agents defined in claim 12 wherein R is an isopropyl radical, m has an average value not less than 0.75, OX is an ester of pyrophosphoric acid, n has an average value between 1.0 and 3.25, the alkyl radical R is an octyl radical, and p has an average value between 0.75 and 2.0.

17. A method according to claim 7 wherein the acid radical is a benzenesulphonic acid ester having the formula:

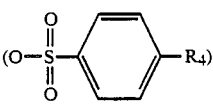

wherein $R_4$ is an alkyl radical of 1 to 30 carbon atoms.

18. A method according to claim 17 wherein the coupling agent is isopropyl tridodecylbenzenesulphonyl titanate.

19. A method according to claim 17 wherein the coupling agent is a mixture of coupling agents defined in claim 17 wherein R is an isopropyl radical, m has an average value not less than 0.75, OX is an ester of benzenesulphonic acid, n has an average value between 1.0 and 3.25, and the alkyl radical R is a dodecyl radical.

20. A method according to claim 1 wherein the coupling agent is present in an amount of 0.05 to 1 percent by mass of the inorganic filler.

* * * * *